Feb. 11, 1930.  H. R. MINOR  1,746,357
METHOD OF AND APPARATUS FOR CURING MOLDED RUBBER ARTICLES
Filed Aug. 28, 1926
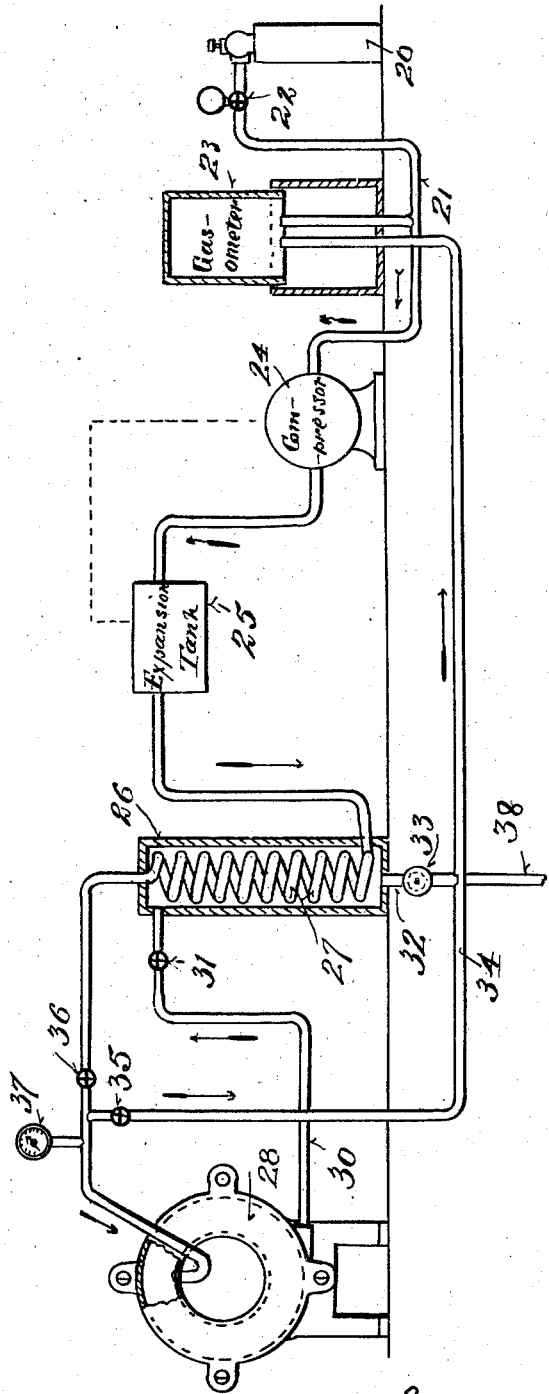
Inventor
Henry R. Minor
By his Attorneys
Dailey & Dailey Patented Feb. 11, 1930

1,746,357

UNITED STATES PATENT OFFICE

HENRY R. MINOR, OF OSSINING, NEW YORK, ASSIGNOR, BY MESNE ASSIGNMENTS, TO INDUSTRIAL PROCESS CORPORATION

METHOD OF AND APPARATUS FOR CURING MOLDED-RUBBER ARTICLES

Application filed August 28, 1926. Serial No. 132,139.

This invention relates to the treatment of molded rubber goods with a preheated inert gas, and has for its object a mode of procedure for effecting a rapid and uniform cure in rubber goods.

The invention, while not limited thereto, is of special value in and of particular application to the curing of molded rubber tubes.

It has heretofore been the practice to cure rubber tubes on circular mandrels. This mode of procedure is, however, neither economical nor satisfactory for many reasons. In order to overcome the several objections, it has been proposed to cure the tubes in circular molds similar to those in which tires are cured. The green tube properly formed and spliced with valve in place, is set in the mold which is placed in a vulcanizing oven and pressure is applied on the inside as heat is applied externally to the mold. For the pressure medium, air is, of course, impractical, as under the influence of both heat and pressure rapid oxidation is set up, and the interior of the tube is thereby seriously damaged and its strength is consequently impaired.

Steam has been tried as a pressure medium, but steam always contains a small amount of air, and even this amount is detrimental and causes damage by oxidation. The main objection to the use of steam as a pressure medium in the vulcanization of rubber tubes is, however, its uncontrollability, as the application of heat on the inside as well as on the outside of the goods, taken with the great thermal capacity of the steam, effects the cure too rapidly and control thereof is impractical, with the inevitable result that the tube is cured unevenly. Moreover, the settling of condensed steam in low places causes the so-called "soft spots" which are a further serious detriment to the tubes.

In my prior applications for Letters Patent, including Patent No. 1,544,023 of June 30, 1925, I have disclosed the use of carbon dioxid ($CO_2$) in connection with the curing of molded rubber articles. The use of carbon dioxid for this purpose gives excellent results. Tubes cured with this medium are of a fine finish and high quality. The time required, however, to effect a cure with carbon dioxid as a pressure medium, is very much longer than the time required when steam is used as the pressure medium. It is a matter, therefore, of great economic importance to solve the problem of accelerating the time of cure with carbon dioxid as the pressure medium.

The purpose of my present invention accordingly, includes the use of an inert or non-oxidizing gas as a pressure medium in the vulcanization of molded rubber articles under conditions whereby the cure of the articles is effected rapidly, economically and with reliable certainty. A further object includes the use of preheated inert or non-oxidizing gas applied expeditiously to the goods to be cured for the purpose of accelerating the cure and at the same time to beneficially act on the rubber thus cured.

Another object of my invention includes the use of an inert gas of great heat carrying capacity, as carbon dioxid ($CO_2$), as compared with air, to thus carry into the tube, or to the surface of the article treated, a sufficient number of heat units to effect and materially accelerate the cure. I also aim to stimulate the circulation of the heating medium in the mold, and if steam is used, I apply the same to preheat the inert pressure medium, and thereby recover the heat units of the heating medium (e. g. steam), and at the same time effect a much greater transfer of heat in the mold.

I have named carbon dioxid ($CO_2$) as the preferred inert or non-oxidizing gas used. But I do not thereby intend to convey the impression that I confine myself to its use. Nor do I thereby limit myself, as I can use other inert gases such as nitrogen (N), flue gases and the like. Likewise, the apparatus herein shown to carry out my invention is to be taken as illustrative rather than in a limiting sense.

I have discovered a mode of treatment for curing rubber articles, whereby the inert non-oxidizing gas, as carbon dioxid, is applied hot to the surface of the goods, and in particular on the interior of the tubes to be cured, that the curing is accelerated and the goods are of superior finish and improved quality.

I have also discovered that by bleeding a small amount of steam from the vulcanizer, particularly during the early part of the cure, and expeditiously applying this steam to preheat the carbon dioxid ($CO_2$), I am able to recover the heat units in the steam and at the same time effect a much greater transfer of heat from the steam in the mold by relieving the so-called static condition of the steam and thereby stimulating circulation.

The prime object therefore of my invention includes, in the method of effecting an accelerated cure of the rubber goods, the utilization of preheated carbon dioxid ($CO_2$) as the inert pressure medium; preferably the inert gas is preheated by an expeditious use of heating medium (i.e. steam) withdrawn from the heater.

The heater may be of any desired type. A preferred form herein used is the so-called watch case heater, wherein the mold is an integral part of the heater and steam is constantly circulating without the mold and in a jacket between said mold and the external cover, as is well known to the art. Due to condensation, and perhaps other causes, in this type of heater, the curing process tends to slow down, and in particular during the first part, because of what is known as static steam. By the utilization of a portion of the heating medium (steam, if that is used), I overcome the static condition of the steam and at the same time the thermal units of the withdrawn steam are utilized to the best advantage in preheating the carbon dioxid. I am thus enabled to recover the heat units in the steam, and at the same time impart a better circulation and a greater transfer of heat because of the relieved static conditions.

Thus it will be apparent that my mode of obtaining and utilizing the preheated inert pressure medium, which specifically is carbon dioxid ($CO_2$), supplies the desired thermal units directly to the surface of the rubber goods to be cured, and affords means for accelerating the cure under conditions which are always under the operator's control.

In the single figure of the accompanying drawing, I have illustrated, somewhat diagrammatically, apparatus designed to carry out my mode of procedure as outlined above, and as defined by the appended claims.

I use any suitable source of gas, as a tank 20, which is provided with a main or gas supply 21, having a regulator valve 22 and gasometer 23. The gas supply or main 21 is also provided with suitable compressor 24, and with an expansion tank 25 of always greater volume than a single unit, but shown herein diagrammatically. From the expansion tank, the main or gas supply enters the pressure heater 26, near the bottom thereof, and extends preferably through a coil 27, and therethrough to the top from whence the heated gas is supplied directly to the interior of the heater 28, which in the form illustrated, is of the watch case type. The heater coil 27 is always of sufficient internal diameter to pass the required volume of gas when heated, and through this coil the gas passes on its way into the heater and to the article to be cured.

A steam supply pipe 30 is arranged to bleed steam from the heater and to deliver it into the pressure heater 26, but externally to the heater coil 27. A valve 31 is provided in the steam pipe for controlling the steam supply. Condensed steam is withdrawn from the bottom of the heater by any suitable means, as pipe 32, having a trap 33, and connected to the boiler return line 38. Connected with the hot gas pipe at any suitable place are valves 35 and 36 respectively in the gas exhaust pipe and the hot gas supply pipe which affords means for supplying, controlling and recovering gas. A suitable indicator 37 shows the pressure within the system.

At the conclusion of the cure, gas within the system may be exhausted to the atmosphere, or it may, preferably, be returned to the gasometer for recirculation.

Having now described my invention, what I claim as new and useful, and desire to secure by Letters Patent is:—

1. The method of treating rubber goods to vulcanize and cure the same which consists in applying a heating medium externally to a mold containing the goods disposed within a closed chamber, subjecting the goods to be treated to the direct action of an inert non-oxidizing curing medium, withdrawing a portion of the externally applied heating medium, and utilizing the withdrawn portion thereof to preheat the inert medium, the withdrawal of a portion of the heating medium effecting circulation of the remainder and a greater transfer of heat to the mold.

2. The method of treating rubber goods to vulcanize and cure the same which consists in applying steam externally to a closed mold containing the goods, subjecting the goods within the mold to the direct action of an inert non-oxidizing curing medium, drawing off a portion of the steam, and utilizing the drawn off portion to preheat the inert non-oxidizing medium before applying the latter to the goods to effect a rapid application of heat internally and externally of the mold.

3. The method of treating rubber goods to vulcanize and cure the same which consists in enclosing the goods to be treated within a closed mold, supplying a heating medium to a closed chamber containing the mold, to externally heat the latter, supplying an inert medium into the mold to directly act upon the goods contained therein, bleeding off a portion of the heating medium from the chamber, and utilizing the portion of heating medium so bled off to preheat the inert medium before delivering the latter into the mold, the bleeding off of a portion of the heating medium effecting an efficient circulation of the remainder.

4. In an apparatus for treating rubber goods to vulcanize and cure the same, a closed heating chamber enclosing a closed mold containing the goods or article to be treated, said heating chamber adapted to receive a heating medium to externally heat the mold, means to supply an inert gas medium into the mold, a heater through which the inert gas is supplied, and means to supply a portion of the heating medium from the heating chamber to the heater to effect the preheating of the inert gas before supplying the latter to the mold.

5. In an apparatus for treating rubber goods to vulcanize and cure the same, a closed heating chamber adapted to receive a heating medium, a closed mold containing the goods or article to be treated, said mold being disposed within said chamber, a supply source for inert curing medium, said supply source delivering to the interior of the mold, a heater through which the curing medium passes in its delivery into the mold, and a connection between the closed heating chamber and the heater, whereby a portion of the heating medium supplied to the heating chamber is permitted to bleed off therefrom through the heater to effect a preheating of the inert curing medium before the latter is delivered into the mold.

6. In an apparatus for treating rubber goods to vulcanize and cure the same, a closed heating chamber enclosing a closed mold containing the goods or article to be treated, said heating chamber being adapted to receive a heating medium to externally heat the mold, means to supply carbon dioxide gas into the mold, and a heater through which the carbon dioxide gas is supplied whereby it is preheated before delivery into the mold.

In testimony whereof I have hereunto set my hand on this 17th day of August A. D., 1926.

HENRY R. MINOR.